United States Patent
Sperber et al.

(10) Patent No.: US 7,451,294 B2
(45) Date of Patent: Nov. 11, 2008

(54) APPARATUS AND METHOD FOR TWO MICRO-OPERATION FLOW USING SOURCE OVERRIDE

(75) Inventors: Zeev Sperber, Zichron Yaakov (IL); Yuval Bustan, Moshav Mismeret (IL); Robert Valentine, Qiryat Tivon (IL)

(73) Assignee: Intel Corporation, Santa Clara, CA (US)

( * ) Notice: Subject to any disclaimer, the term of this patent is extended or adjusted under 35 U.S.C. 154(b) by 459 days.

(21) Appl. No.: 10/631,629

(22) Filed: Jul. 30, 2003

(65) Prior Publication Data

US 2005/0027967 A1 Feb. 3, 2005

(51) Int. Cl.
*G06F 9/30* (2006.01)

(52) U.S. Cl. ............................. 712/216; 712/22

(58) Field of Classification Search ............. 712/216, 712/22
See application file for complete search history.

(56) References Cited

U.S. PATENT DOCUMENTS

| | | | | |
|---|---|---|---|---|
| 5,398,321 A | * | 3/1995 | Jeremiah | 712/216 |
| 6,047,369 A | * | 4/2000 | Colwell et al. | 712/217 |
| 6,745,319 B1 | * | 6/2004 | Balmer et al. | 712/223 |
| 6,820,190 B1 | * | 11/2004 | Knebel et al. | 712/215 |
| 6,877,084 B1 | * | 4/2005 | Christie | 712/203 |

* cited by examiner

*Primary Examiner*—Eric Coleman
(74) *Attorney, Agent, or Firm*—Blakely, Sokoloff, Taylor & Zafman LLP

(57) ABSTRACT

A method and apparatus for a two micro-operation flow using source override. In one embodiment, the method includes the identification of a macro-instruction having one or more streaming single instruction multiple data extension type operands. Once received, the macro-instruction is decoded into a first micro-operation (uOP) and a second uOP. Once decoded, a signal is asserted to disable source operand override logic if the first micro-operation updates a logical destination register that matches a logical source register of the micro-operation. Otherwise, the mutual source override is active and executed by a register alias table (RAT) when uOP with matching logic source and destination register are detected in a same clock cycle. In doing so, macro-instructions having 128-bit operands may be processed using, for example, two uOPs (one for the lower half and one for the upper half) in a 64-bit implementation, while preserving the atomicity of the original instruction.

30 Claims, 10 Drawing Sheets

US 7,451,294 B2

APPARATUS AND METHOD FOR TWO MICRO-OPERATION FLOW USING SOURCE OVERRIDE

FIELD OF THE INVENTION

One or more embodiments of the invention relate generally to the field of integrated circuit and computer system design. More particularly, one or more of the embodiments of the invention relate to a method and apparatus for two micro-operation flow using source override.

BACKGROUND OF THE INVENTION

Internet audio and video streaming, as well as image processing and video content creation are continuously driving system architects to design even faster microprocessors. To improve microprocessor performance, several techniques are utilized to improve the efficiency of modern day processors. One such technique for providing more efficient microprocessors is "Dynamic Execution". In summary, Dynamic Execution functions by determining the most efficient manner for executing program instructions, irrespective of the order in which the program instructions are received.

Dynamic Execution utilizes front-end logic that fetches the next instructions within a program and prepares the instructions for subsequent execution in the machine pipeline. This front-end logic utilizes highly accurate branch prediction logic that uses the past history of program execution to speculate where the program is going to execute next. The predicted instruction address from this front-end branch prediction logic is used to fetch instruction bytes from a level two (L2) cache. Once fetched, these instruction bytes are decoded into basic operations called uOPs (micro-operations) that the execution core can execute.

As such, these micro-operations are provided to out-of-order (OOO) logic, along with a sequence number assigned to each micro-operation. The OOO logic has several buffers that it uses to sort and reorder the flow of instructions to optimize performance as instructions go down the pipeline and get scheduled for execution. This OOO logic allows program instructions to proceed around the delayed instructions as long as they do not depend on those delayed instructions. As a result, micro-operation do not stall when following delayed instructions, in which case, efficiency dictates that the instructions execute in an out-of-order fashion.

The Dynamic Execution logic generally includes retirement logic that reorders the instructions, executed in an out-of-order fashion (dynamic manner), back into the original program order. As a result, the OOO logic generates a pool of active micro-operations that can be executed in a manner which is more efficient than conventional systems. However, in order to implement out-of-order execution, register allocation and renaming logic is required to allocate physical register to logical destination registers and rename logical source registers into physical registers in order to utilize physical register files. In addition, the allocation and renaming logic is required for execution of legacy instructions with improved efficiency.

Dynamic execution is implemented within microprocessors that support 128-bit streaming single instruction multiple data (SIMD) extensions (SSE) and streaming SIMD extensions 2 (SSE2) instruction set architectures (ISA). Generally, the 128-bit SSE and SSE2 ISAs may be implemented by splitting each 128-bit instruction into two micro-operations (uOPs) that generate the lower and upper 64-bit chunks of the 128-bit register. These two halves of the architectural register are treated internally as two independent registers.

Unfortunately for some instructions from the SSE/SSE2 ISAs, a problem arises when the source and destination are the same and a copy of the original source is required to service the second destination. This problem arises since the two uOP implementation does not preserve the atomicity of the original instruction. As a result, in a 64-bit implementation, various 128-bit instructions are implemented using three uOPs instead of two uOPs to prevent corruption of the data by the out-of-order execution flow. As a result, each additional uOP requires additional resources within the OOO logic as well as the uOP execution units.

BRIEF DESCRIPTION OF THE DRAWINGS

The various embodiments of the present invention are illustrated by way of example, and not by way of limitation, in the figures of the accompanying drawings and in which.

DETAILED DESCRIPTION

A method and apparatus for a two micro-operation flow with disabled mutual source override are described. In one embodiment, the method includes the identification of a macro-instruction having one or more streaming single instruction multiple data extension data type operands. Once received, the macro-instruction is decoded into a first micro-operation (uOP) and a second uOP. Once decoded, a signal is asserted to disable mutual source operand override logic if the first uOP updates a logical destination register that matches a logical source register of the second uOP. Otherwise, the mutual source override is active and executed by a register alias table (RAT) when uOPs with source matching source and destination are detected. In doing so, macro-instructions having 128-bit operands may be processed using, for example, two uOPs (one for the lower half and one for the upper half) in a 64-bit implementation, while preserving the atomicity of the original instruction.

In the following description, numerous specific details such as logic implementations, sizes and names of signals and buses, types and interrelationships of system components, and logic partitioning/integration choices are set forth in order to provide a more thorough understanding. It will be appreciated, however, by one skilled in the art that the invention may be practiced without such specific details. In other instances, control structures and gate level circuits have not been shown in detail in order not to obscure the invention. Those of ordinary skill in the art, with the included descriptions, will be able to implement appropriate logic circuits without undue experimentation.

System

Figure 1:
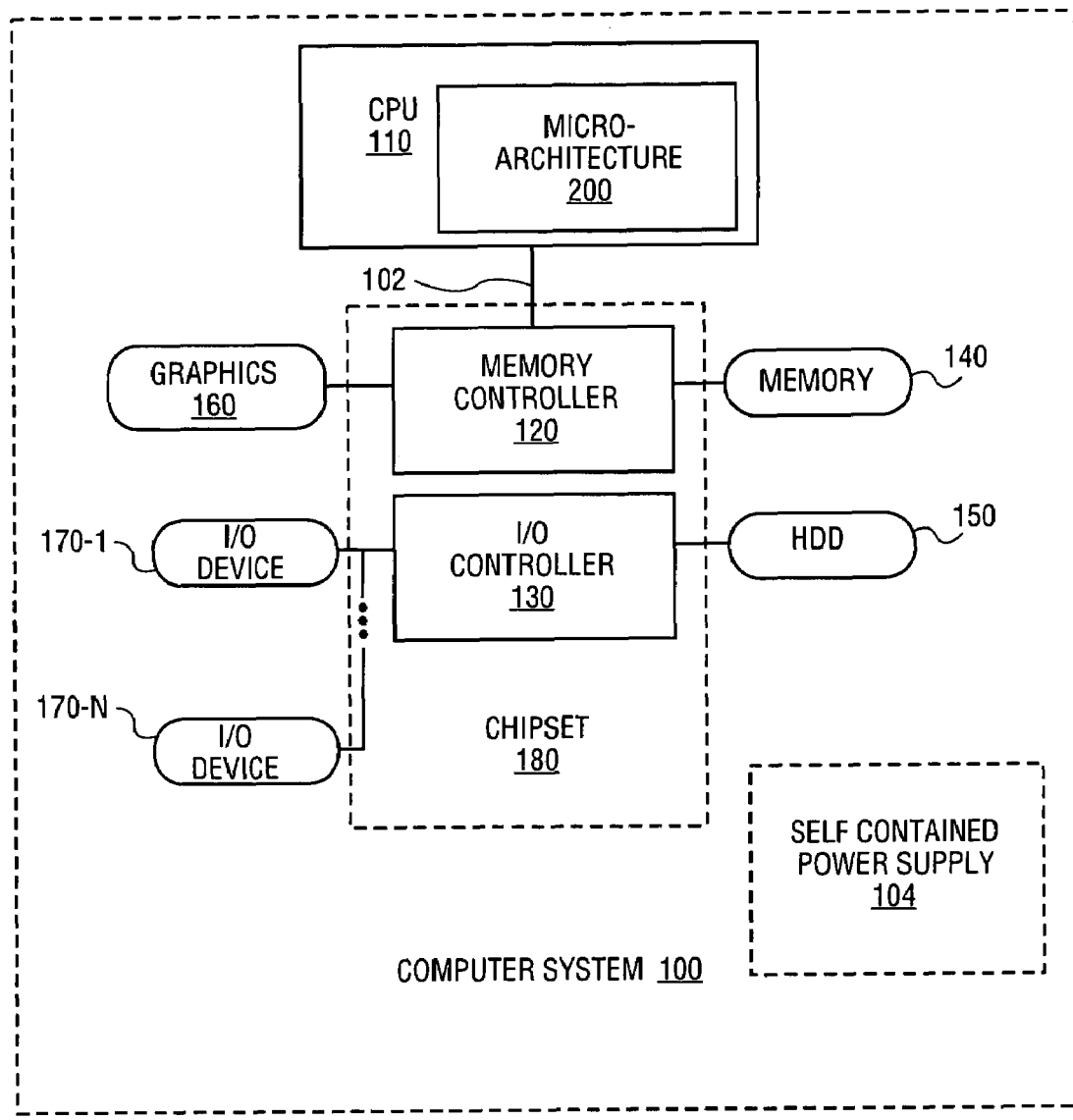
FIG. 1 is a block diagram illustrating a computer system including a micro-architecture for implementing a two micro-operation flow with disabled mutual source override, in accordance with one embodiment of the invention.

FIG. 1 is a block diagram illustrating a computer system 100 including a processor 110 having micro-architecture 200, in accordance with one embodiment of the invention. In one embodiment, micro-architecture 200 may enable/disable mutual source override logic, in accordance with one embodiment of the invention. Computer system 100 comprises a processor system bus (front side bus (FSB)) 102 for communicating information between the processor (CPU) 110 and a chipset 180 coupled together via FSB 102.

As described herein, the term "chipset" is used in a manner well-known to those skilled in the art to describe collectively the various devices coupled to CPU 110 to perform desired system functionality. Chipset 180 is comprised of a memory controller or memory controller hub (MCH) 120, as well as an input/output (I/O) controller or I/O controller hub (ICH) 130. Memory controller 120 of chipset 180 is coupled to main memory 140 and one or more graphics devices or graphics controller 160.

In one embodiment, main memory 110 is volatile memory, including but not limited to, random access memory (RAM), synchronous RAM (SRAM), double data rate (DDR) S-data RAM (SDRAM), rambus data-RAM (RDRAM), or the like. In addition, hard disk drive devices (HDD) 150, as well as one or more I/O devices 170 (170-1, . . . , 170-N) are coupled to I/O controller 130 of chipset 180. As illustrated, CPU 110 includes micro-architecture 200 for enabling/disabling mutual source override logic, which is further illustrated with reference to FIG. 2.

It should be understood that embodiments of the invention may be used in any apparatus having a processor. Although embodiments of system 100 are not limited in this respect, system 100 may be a portable device that include a self contained power supply (source) 104, such as a battery. A non-exhaustive list of examples of such portable devices includes laptop and notebook computers, mobile telephones, personal digital assistants (PDAs), and the like. Alternatively, system 100 may be a non-portable device, such as, for example, a desktop computer or a server computer not including optional source 104.

Processor 110 of FIG. 1 may be implemented to support various instruction set architectures. For example, in one embodiment, micro-architecture 200 of FIG. 2 may operate using, for example, 64-bit registers. However, processor 110 may support, for example, a 128-bit instruction set architecture (ISA) such as, for example, 128-bit streaming single instruction multiple data (SIMD) extensions (SSE) as well as streaming SIMD data extension two (SSE2) ISAs ("128-bit ISA"). In one embodiment, 128-bit registers of the 128-bit ISA are contained within register file 260 (FIG. 2).

In order to implement a 128-bit ISA using a 64-bit micro-architecture, in one embodiment, 128-bit operands of received macro-instructions are decoded into first and second uOPs by splitting each 128-bit register operand into two uOPs that generate the lower (least significant bit (LSB)) and upper (most significant bit (MSB)) 64-bit chunks of the 128-bit target register. Other instructions can be decoded into more uOPs if the uOP flow requires more operation. As described herein, the first uOPs refers to a uOP generated to handle a 64 LSB of the 128-bit source, while the second uOP refers to a uOP generated to support the 64 MSB of the received 128-bit source. In one embodiment, these two halves of the architectural register are treated within the micro-architecture as two independent registers, such as, micro-architecture 200 of FIG. 2.

Figure 2:
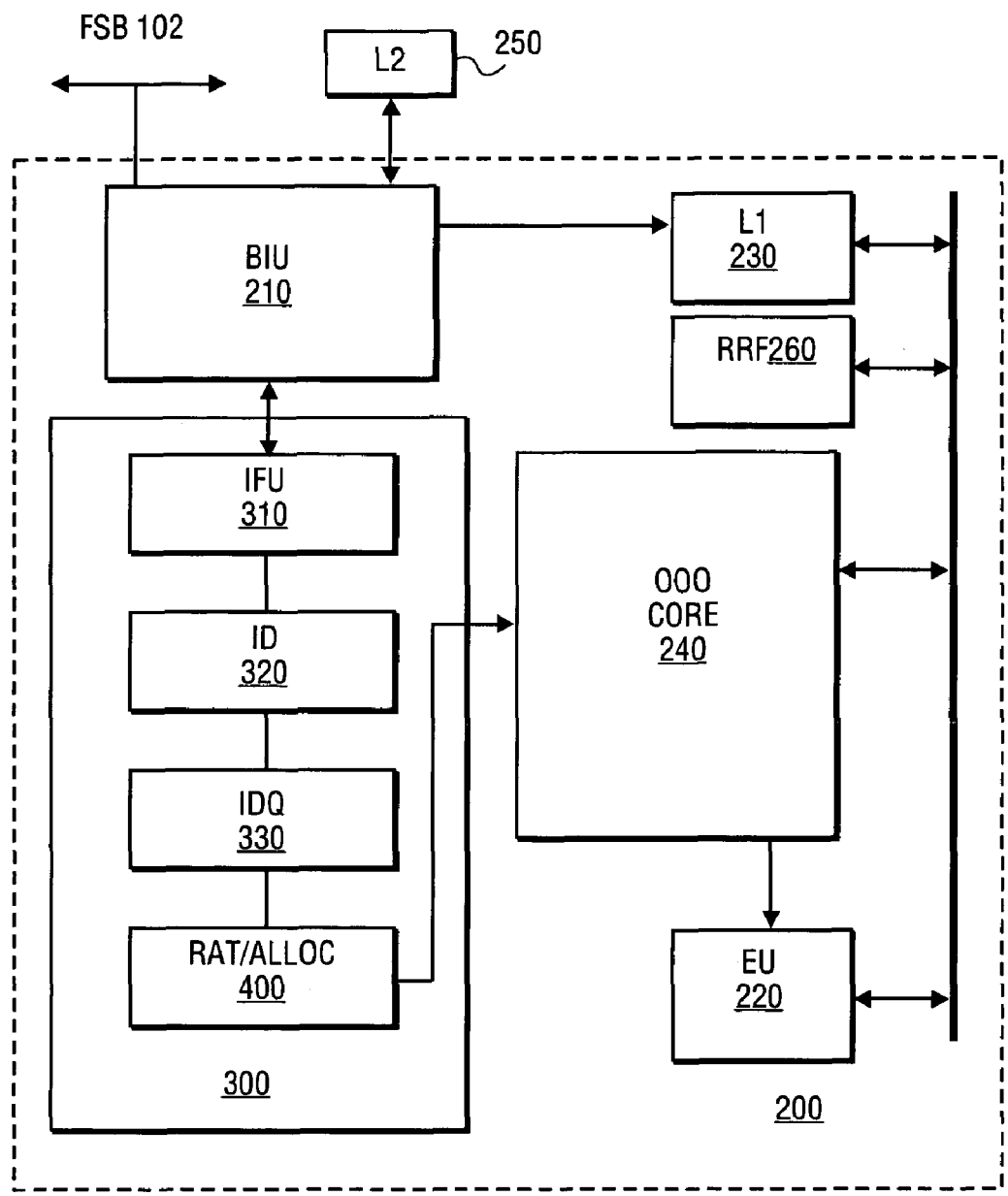
FIG. 2 is a block diagram further illustrating the micro-architecture of FIG. 1, in accordance with one embodiment of the invention.

FIG. 2 illustrates micro-architecture 200 of CPU 110 to show enabling/disabling of the mutual source override logic, as described below. In the embodiment illustrated, micro-architecture 200 is configured to perform dynamic execution. As described herein, dynamic execution refers to the use of front-end logic 300 to fetch the next instructions according to program order and prepare the instructions for subsequent execution in the system pipeline. As illustrated, front-end logic 300 is comprised of an instruction fetch unit 310 which fetches the upcoming program instructions for execution and prepares the instructions for future use within the system pipeline.

In effect, the front-end logic 300 supplies a high bandwidth stream of decoded instructions to the out-of-order (OOO) core, which directs execution (the actual completion) of the instructions. To execute the instructions in the most efficient manner, the front-end logic 300 may utilize highly accurate branch prediction logic (not shown) in order to speculate where a program will execute next, or as referred to herein, dynamic execution. Once received, micro-operations are scheduled to avoid stalling when following delayed instructions. In other words, micro-operations are executed in an "out-of-order" execution fashion when required to ensure the most efficient use of available processor resources.

Accordingly, front-end logic 300 may include an instruction fetch unit (IFU) 310 for fetching macro-instructions from, for example, level 2 cache (L2) 250 via bus interface unit (BIU) 210. Once the instructions are fetched, the instructions are decoded into basic operations, referred to herein as micro-operations (uOPs), that the execution units (EU) 230 execute. In other words, IFU 310 will fetch a macro-instruction from, for example, L2 cache 250, which is provided to instruction decoder (ID) 320. In response to the received macro-instruction, ID 320 decodes the macro-instruction into one or more uOPs that are provided to instruction decoder queue (IDQ) 330. Subsequently, the uOPs are provided to a register alias table and allocation (RAT/ALLOC) logic 400.

In one embodiment, RAT/ALLOC logic 400 is responsible for determining whether received uOPs reference any source operands. Once such uOPs are identified, the processor determines if the source operand should be taken from an actual instruction set register, contained with Real Register File (RRF) register file 260, or from a hidden system register in a recorder buffer (ROB) (not shown) that is used for executing received uOPs. In other words, a programmer, when generating programming code, utilizes various system registers for manipulating data. The various system registers of, for example, assembly code or high level program code, are referred to herein as the "logical source operands" of a received macro-instruction. ALLOC logic 400 allocates, for each logical destination register, a physical register. RAT logic renames the logical sources into physical registers or an architectural register in RRF 260.

In contrast, when a uOP is received by ALLOC logic 400, the uOP is allocated an entry within a translation array in RAT 400 (FIG. 3A) and its destination register is assigned a pointer to a physical register. Generally, RAT logic 400 is utilized to overcome false register dependencies to enable simultaneous execution of received uOPs within execution units 230. To achieve such functionality, RAT 400 may include mutual source override logic, as further illustrated with reference to FIG. 3A.

Figure 3A:
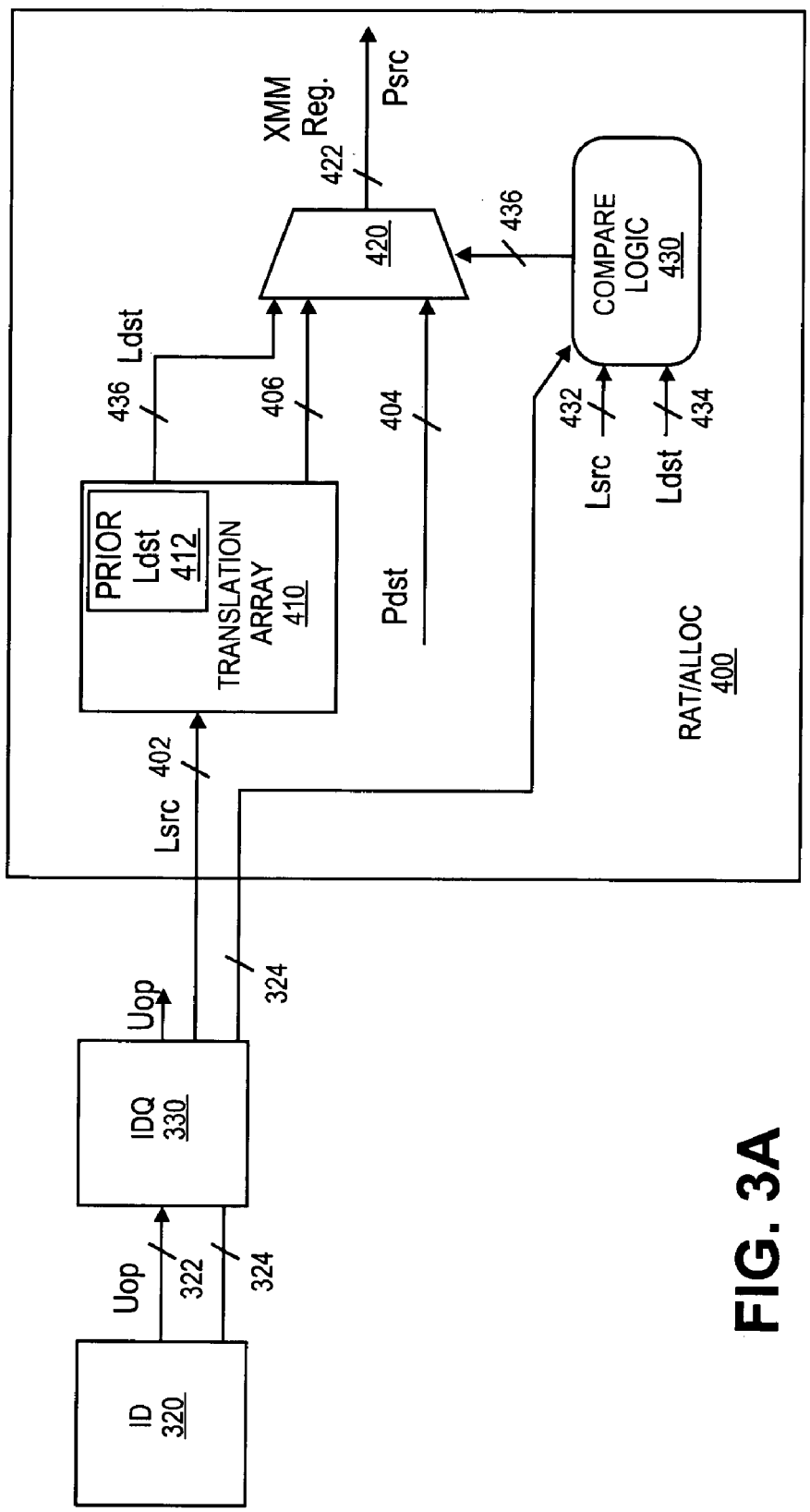
FIG. 3A is a block diagram further illustrating register alias table logic of FIG. 2, in accordance with a further embodiment of the invention.

As illustrated in FIG. 3A, the term "mutual source override logic" as described herein collectively includes a source/destination compare block 430 as well as multiplexer (MUX) 420. Block 430 compares logical source operands 408 of a received micro-instruction 322B against logical destination operands 402 of previously received uOPs 324A in the same clock cycle (renaming window). Generally, the RAT logic 400 receives, for example, three uOPs within a single clock cycle or renaming window. In other words, the mutual source override logic attempts to detect situations where a value generated by a previous uOP (its logical destination) is used as a source for a subsequent uOP. When such a case is detected, RAT logic 400 replaces logical source operands 408 of a second (subsequent) uOP 322B with a physical register location value 404 of a first (prior) uOP 322A instead of the physical register location value (Pdst) 404 read from the translation array 410. This is referred to herein as "mutual source override".

In operation, the RAT 400 uses the compare logic 430 to determine whether a logical source register (Lsrc) 408 of the second uOP 322B matches a destination register value 402 assigned to the first uOP 322A. When such is detected, MUX 420 is enabled to select the result value or physical destination 404 of the first uOP 322A. This physical destination 404 of the first uOP 322A replaces the source register value 406 assigned to the second uOP 322B to receive a result 404 generated by the first uOP 322A as a source 422 of the second uOP 322B. In other words, the physical destination 404 assigned to the first uOP 322A will replace a physical source 406 assigned to the second uOP within translation array 410.

Figure 3B:
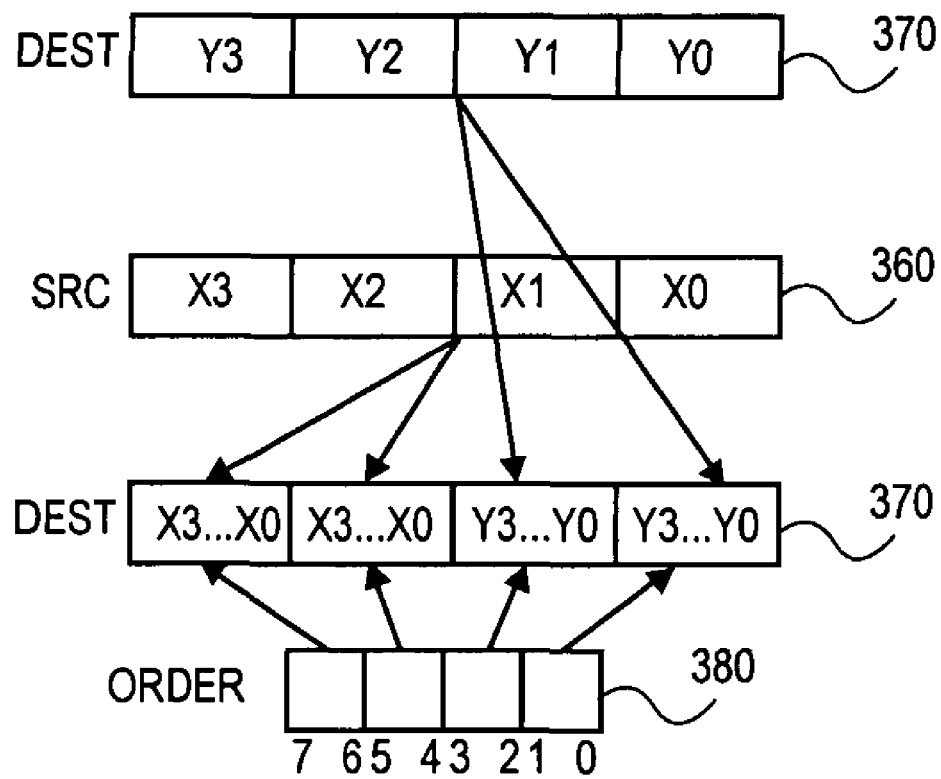
FIG. 3B is a block diagram illustrating a data shuffle instruction, in accordance with one embodiment of the invention.

Unfortunately, for some instructions, a problem arises when a source and destination operand of a received macro-instruction are the same, requiring a copy of original source data to be made to preserve and service the second destination. The problem occurs because the two micro uOP implementation of the 128-bit ISA does not preserve the atomicity of the original instruction. For example, a 128-bit register-to-register shuffle uOP uses three uOPs instead of two uOPs to prevent corruption of the data by the 000 logic. A shuffle operation (SHUFPS) 350 is illustrated with reference to FIG. 3B.

As illustrated, the instruction selects one of four 32-bit values of the destination register 370 to place into each 32-bit field in the lower 64-bit (LSB) portion of the destination register 370. The instruction then selects one or four 32-bit values of the source register 360 to place into each 32-bit field in the upper 64-bit of the destination register 370. The selection is made according to an 8-bit immediate 380 (2 bits are used as an operand selection value per 32-bit of the destination). The shuffle instruction is unique SSE instruction since it does not work in parallel on the different elements. When this algorithm is converted into two 64-bit uOPs, each uOP receives the 128-bit source (split into two 64-bit values) and uses a 4-bit operand select immediate to select the proper values for each of the 64-bit target locations.

Usually, shuffle operations are used to reorder data elements into proper (desired) location prior to execution. To prevent using additional registers, software performs the shuffle in place using the same register for the source and destination operands. In one embodiment, the following two uOP micro-code flow can be used to implement such an instruction:

destination_low=shuffle (destination_high, destination_low);
destination_high=shuffle (source_high, source_low);

In the case where the logical source register (source low) is the same as the logical target register (destination_low), RAT 400 (FIG. 2) is unaware that the two uOPs belong to the same instruction. RAT 400, according to the mutual source override, detects that the logical destination of the first uOP (destination_low) is the same register as the logical source of the second uOP. Since these values share the same logical register name, they are considered the same. As a result, RAT 400 bypasses the value for the second uOP from the first uOP and corrupt the contents of the destination register.

To avoid corruption of the destination register, a three uOP flow is designed to preserve the initial value such that a renamed version of the first uOP (destination low) is not used as a low 64-bit source of the second uOP that creates the destination value. Unfortunately, this may lead to a 15% increase of additional uOPs in some applications causing a performance problem. As a result, the three uOP flow may be generated as follows:

temp_source_low:=move(source_low);
destination_low:=pfp_shuffle(destination_high, destination_low);
destination_high:=pfp_shuffle(source_high, temp_source_low);

To rectify this issue, as illustrated in FIG. 3A, in one embodiment, ID 320 generates an override signal 324 (324A/324B), which is provided along with the decoded first uOP 322A and second uOPs 322B to IDQ 330. In other words, ID 320 generates an additional signal 324, which is provided to disable the mutual source override logic in situations where a logical destination operand of a first uOP within a two uOP flow matches a logical source operand of the second uOP of the two uOP flow. Accordingly, when ID 320 decodes a received macro-instruction, which requires generation of a three uOP flow, in order to prevent data corruption during the out-of-order execution, ID 320 enable/disables signal 322. In other words, ID 320 decodes the received macro-instruction into 2 uOP flow, with override signal 324, instead of the 3-uOP flow.

In response to received signal 324, RAT 400 disables the mutual source override between the received uOPs of the flow. This ensures the result of the first uOP is not used as a source of the second uOP to allow the proper value to be used by both operations. In other words, as illustrated with reference to FIG. 3A, RAT 400 receives Lsrc (logical source) 408 of the second uOP 322B as well as Ldst (logical destination) 402 of the first uOP 322A. Once received, compare logic 430 determines whether a match of the logical register names occurs. A match occurs when a name of Lsrc 408 is the same as a name of Ldst 402 of a previous uOP 322A in the same renaming window. If a match occurs, a physical destination 404 is caused to override a physical register location value 406 read from translation array 410. As a result, the physical source operand 422 of the second uOP 322B identifies a result generated by the first uOP 322B.

As indicated, the mutual source override logic prevents proper execution of the received macro-instruction. As a result, under certain conditions, ID 320 asserts signal 324 to direct compare block 430 to disable the mutual source override. Consequently, the three uOP flow, as described above, may be reduced to a two uOP flow. In one embodiment when the first uOP is the last uOP received in a clock cycle, Prior Ldst block 412 stores a logical destination value of the first uOP, prior to being modified by the first uOP.

In one embodiment, if a read port is not added, the value is read from translation array 410 for one of the sources of the first uOP. Next, the logic checks if a destination logical address is equal to a logical address of source 1 or source 2 and stores the value associated with the read port of that source. During a next clock cycle, compare logic 430 assigns the stored value Ldst 436 as a physical source 422 of the second uOP 322B that has the same logical address as the logical address of the destination of the first uOP.

Although embodiments described herein refer to support of a 128-bit ISA using a 64-bit micro-architecture, those skilled in the art will realize that embodiments described herein may be applied to various sized instruction set architectures, as well as various sized micro-architectures and therefore, the embodiments described herein are not limited to a 128-bit ISA executed using a 64-bit micro-architecture. Procedural methods for implementing embodiments of the invention are now described.

Operation

Figure 4:
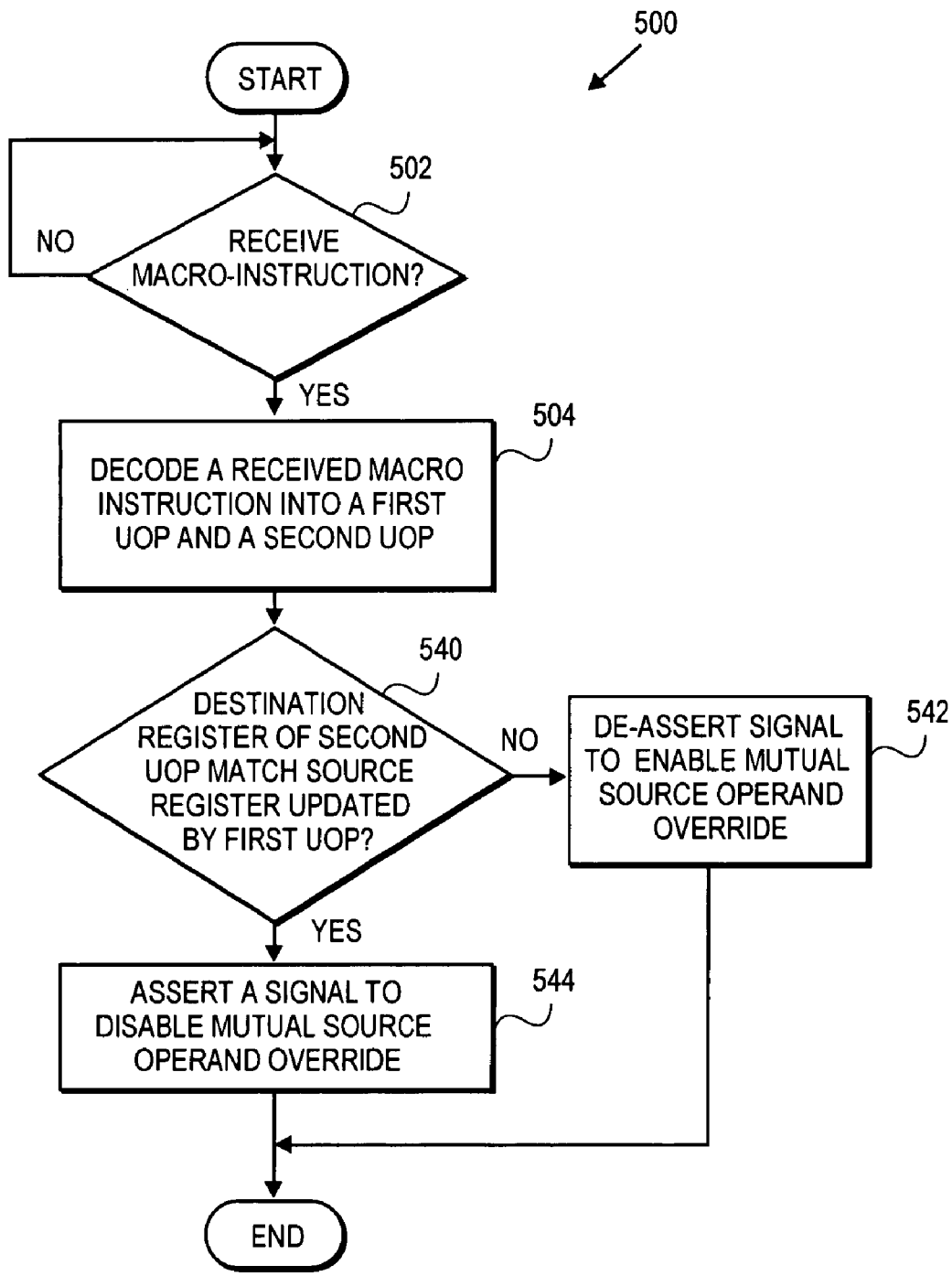
FIG. 4 is a flowchart illustrating a method for generating a signal to disable mutual source override, in accordance in with one embodiment of the invention.

FIG. 4 is a flowchart illustrating a method 500 for generating a signal to disable mutual source override, in accordance with one embodiment of the invention. In one embodiment, method 500 is utilized to describe, for example, operation within RAT/ALLOC block 400, as well as ID 320 and IDQ 330 of FIG. 3A. At process block 502, it is determined whether a macro-instruction is received having one or more streaming single instruction multiple data (SIMD) extension data type (SSE/SSE2) operands. In one embodiment, the received macro-instruction is, for example, a shuffle instruction, which may utilize a single source operand or register value as both the source and destination operands of the macro-instruction.

Once received, at process block 504, the received macro-instruction is decoded into a first uOP and a second uOP. In one embodiment, this is performed with ID 320 such that the first uOP refers to the 64 LSB of the source operand of the received macro-instruction, while the second uOP refers to the 64 MSB of the source operand of the received macro-instruction. Once decoded, at process block 540, it is determined whether a logical source register name of the second uOP matches a logical destination register name of the first uOP. Updating of the logical destination register by the first uOP corrupts the result value generated by the second uOP. When such is the case, at process block 544, a signal is asserted to disable mutual source operand override, in accordance with one embodiment of the invention. Otherwise, the mutual source override is enabled by deassertion of the signal.

In one embodiment, the signal can be set even without checking is src==dest. In this case, the RAT will not identify a need to override and no harm will be caused by the wrong signal. This may be the case in case the logical source signals are critical or unknown when the decoding is performed. The main issue is to identify the set of instructions in which a wrong override may occur and to prevent the override in case src==dest.

As described herein, the terms "enable" or "set" or "assert" or the like may refer to either driving a high signal value or a low signal value. In other words, the embodiments described herein include architectures which support active low signals as well as architectures that support active high signals. As a result, a signal may be de-asserted by either driving a signal high or driving a signal low, depending on the architectural configuration as active low or active high. At process block 542, if a source/destination register match is not detected, the signal is de-asserted to enable the mutual source override logic. As illustrated in FIG. 3A, ID 320 generates signal 324 to either enable or disable the mutual source override logic, in accordance with the embodiments described herein.

Figure 5:
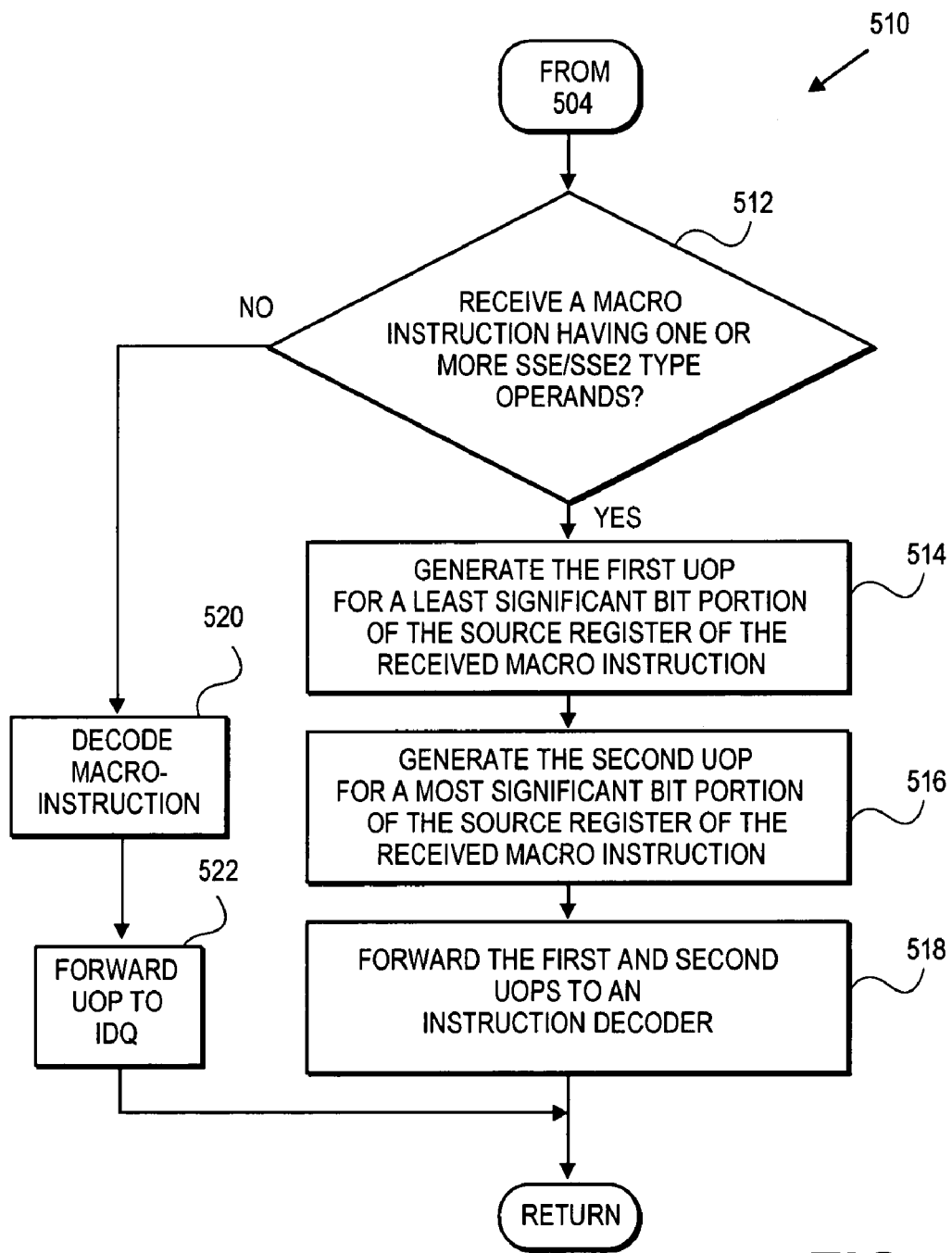
FIG. 5 is a flowchart illustrating a method for decoding a received macro-instruction into first and second micro-operations, in accordance with one embodiment of the invention.

FIG. 5 is a flowchart illustrating a method 510 for decoding the received macro-instruction of process block 504 of FIG. 4 in accordance with one embodiment of the invention. At process block 512, it is determined whether a received macro-instruction is a macro-instruction having one or more SSE/SSE2 type operands. When such a macro-instruction is detected, at process block 514, the received macro-instruction is decoded to generate the first uOP for the LSB portion of the source register of the received macro-instruction. At process block 516, the second uOP is generated for the MSB portion of the source register of the received macro-instruction. At process block 518, the first and second uOP are forwarded to, for example, an instruction decoder. Otherwise, at process block 520, the received macro-instruction is decoded into one or more uOPs, which are forwarded at process block 522 to, for example, ID 330 (FIG. 3A).

In the mutual source override logic described with reference to FIG. 3A, RAT 400 will receive a maximum of three uOPs within a single clock cycle. In addition, RAT 400 also receives a signal during each clock cycle to determine whether to enable or disable the mutual source override. However, in certain embodiments, RAT 400 may receive a first uOP within a first clock cycle or allocation window and receive the second uOP within a next clock cycle or next allocation window. In order to aid RAT 400 in identification of the first and second uOPs, the first and second uOPs may be provided to RAT 400 within the same clock cycle by IDQ 330.

Figure 6:
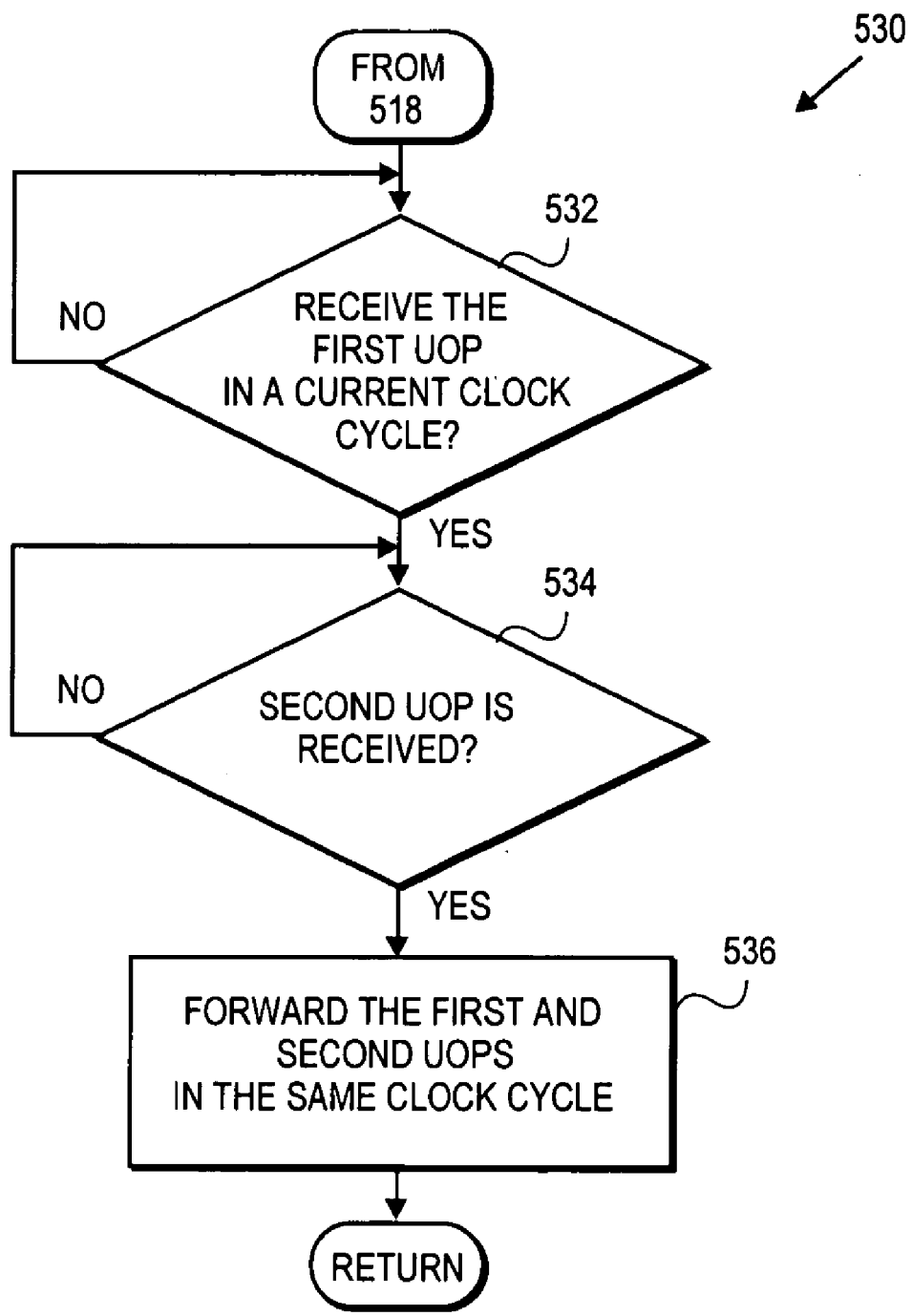
FIG. 6 is a flowchart illustrating a method for forwarding the first and second micro-operations to an instruction decoder queue, in accordance with one embodiment of the invention.

FIG. 6 is a flowchart of a method 530 for forwarding the first and second uOPs from IDQ 330 to RAT 400. At process block 532, it is determined whether a first uOP is received by IDQ 330 in a current clock cycle. Once the first uOP is received, at process block 534, it is determined whether the second uOP is received by IDQ 330. In the embodiment illustrated, forwarding of the first uOP to the RAT is delayed until the second uOP is received such that RAT 400 receives the first and second uOP in the same clock cycle.

Accordingly, at process block 536, the first and second uOPs are forwarded to RAT 400 within the same clock cycle. As a result, RAT/ALLOC logic is simplified by restricting IDQ 330 to transmitting the first and second uOPs within a same clock cycle. In an alternative embodiment, IDQ 330 may transmit the first uOP within a final slot of a current renaming window. As described herein, the renaming window or single clock cycle receives at most three uOPs. However, since the first uOP is forwarded first, receiving the first uOP in the final slot means that the second uOP is received at the first slot of a next clock cycle In such embodiments, RAT 400 is responsible for further inhibiting the mutual source override within the next clock cycle. In one embodiment, if the RAT receives the first uOP in one cycle and the next uOP in the next renaming window, the RAT saves the value of the register from before the first uOP. Once saved, the RAT monitors retirement/WB (writeback=executes) of the uOPs associated with the saved Psrc (if that uOP retires, its Psrc will change to point to the architectural register—RRF—and not to the in-flight registers in the ROB) until the next cycle arrives so that the value saved can be overridden if the saved Psrc writes back or retires.

Figure 7:
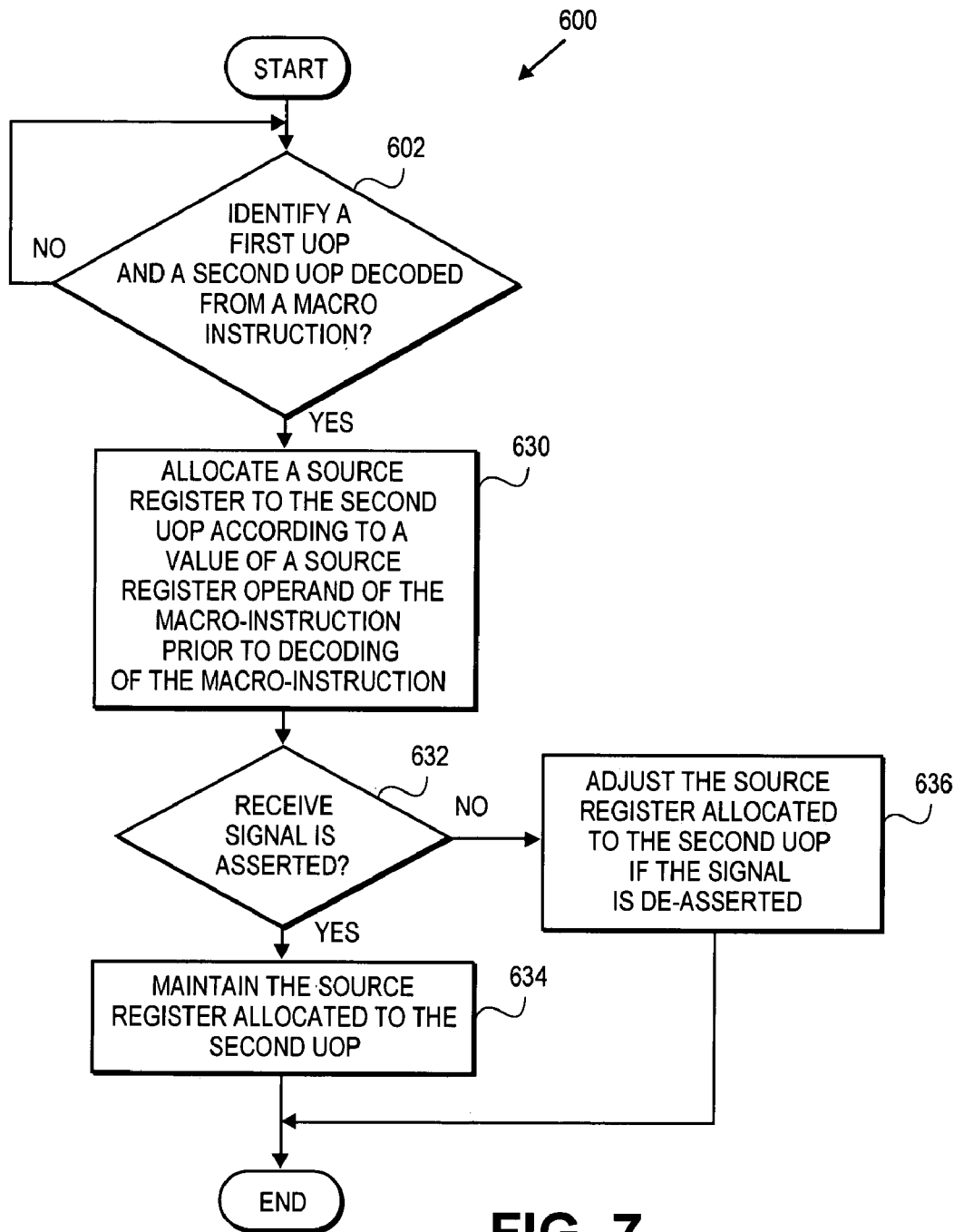
FIG. 7 is a flowchart illustrating a method for disabling mutual source override logic in response to a received signal, in accordance with one embodiment of the invention.

FIG. 7 is a flowchart illustrating a method 600 for prohibiting overriding of a physical source register allocated to a second uOP according to a received signal, in accordance with one embodiment of the invention. Method 600 is described herein with reference to FIG. 3A. At process block 602, it is determined whether a first and second uOP, decoded from a macro-instruction having one or more SSE/SSE2 data type operands, are received. Once received, at process block 630, a physical source register is allocated to the second uOP according to a value of a logical source register operand of the macro-instruction prior to decoding of the macro-instruction. Prior to allocation, at process block 602, physical source and destination registers are also allocated to the first uOP. At process block 632, it is determined whether a received signal is asserted, such as signal 324 (FIG. 3A). If the received signal is asserted, the physical source register value allocated to the second uOP is not overridden by result value generated by the first uOP.

Otherwise, at process block 636, the mutual source override logic will determine whether to override the physical source register allocated to the second uOP. As indicated above, this operation is performed by RAT 400 to preserve the use of internal registers and identify situations where a result generated by a previous (first) uOP should function as a source for a subsequent (second) uOP. However, for certain instructions, such as shuffle instructions, the mutual source override will corrupt the result value generated for such instructions. As a result, in certain scenarios, ID 320 disables the mutual source override logic to avoid corruption of the generated result values generated by the second uOP in the two uOP flows described above in order to achieve correct results.

Figure 8:
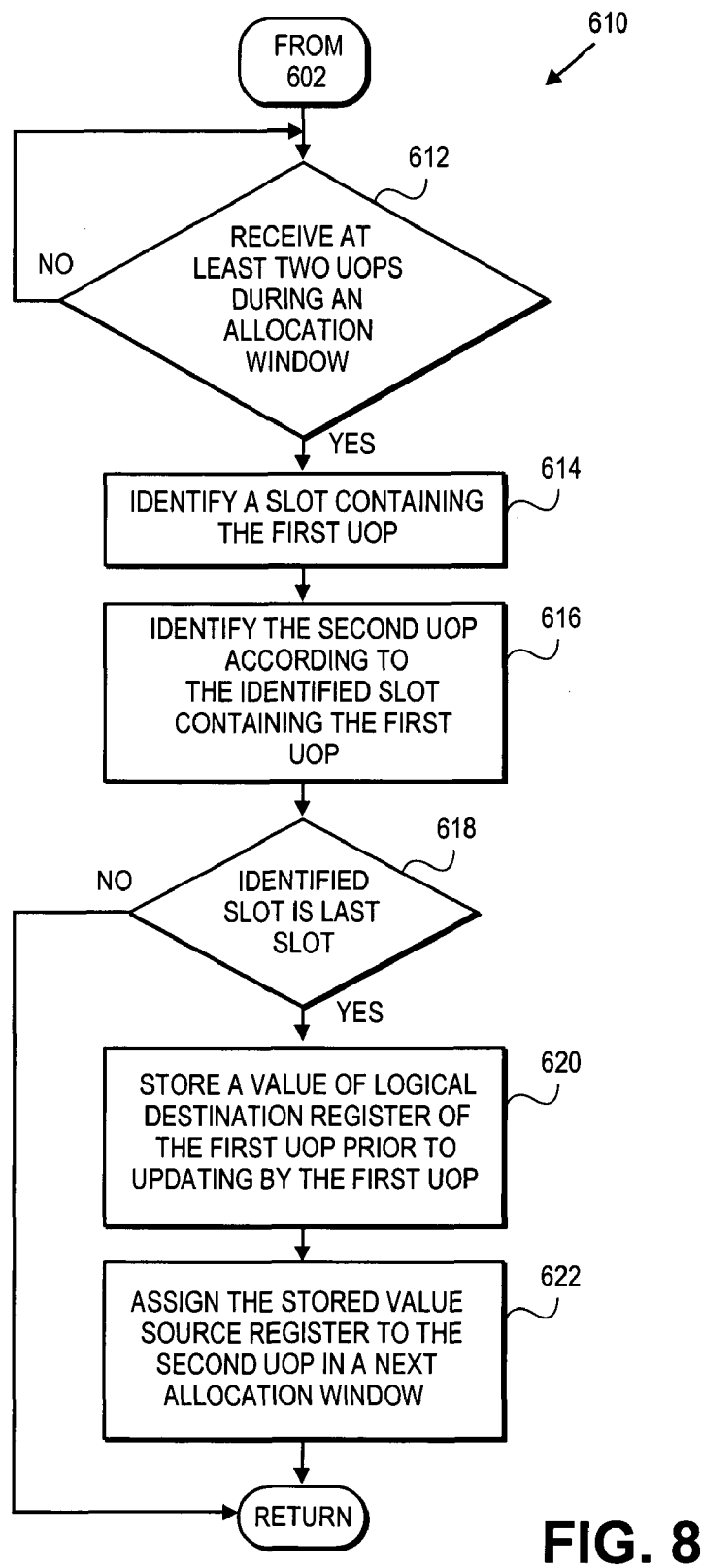
FIG. 8 is a flowchart illustrating a method for identifying first and second micro-operations decoded from a macro-instruction, in accordance with one embodiment of the invention.

FIG. 8 illustrates a flowchart of a method 610 for identifying the first and second uOPs of process block 602 of FIG. 7, in accordance with one embodiment of the invention. At process block 612, it is determined whether at least two uOPs are received during an allocation window. Once received, at process block 614, a slot containing the first uOP is identified. The slots include a first, second and third or final slot. As a result, when the first uOP is received within either the first or second slots, the two uOPs of the flow are received within the same clock cycle.

At process block 616, a second uOP is identified according to the slot containing the first uOP. However, at process block 618, it is determined whether the slot containing the first uOP is the third or last slot. When the first uOP is received in a final slot, the RAT logic 400 stores a value of a logical register of the first uOP prior to being updated at process block 620. At process block 622, the stored value is assigned as a physical source register of the second uOP in the next allocation renaming window or next clock cycle. In one embodiment, the value of the logical register of the first uOP is stored in prior Ldst block 412 (FIG. 3A).

Figure 9:
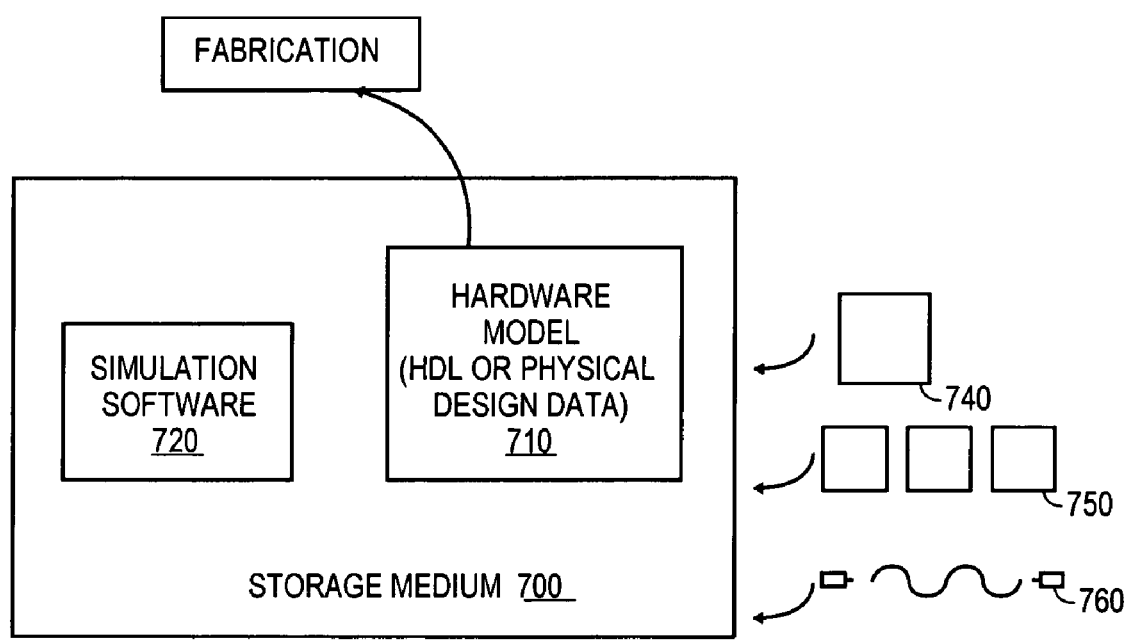
FIG. 9 is a block diagram illustrating various design representations or formats for simulation, emulation and fabrication of a design using the disclosed techniques.

FIG. 9 is a block diagram illustrating various representations or formats for simulation, emulation and fabrication of a design using the disclosed techniques. Data representing a design may represent the design in a number of manners. First, as is useful in simulations, the hardware may be represented using a hardware description language, or another functional description language, which essentially provides a computerized model of how the designed hardware is expected to perform. The hardware model 710 may be stored in a storage medium 700, such as a computer memory, so that the model may be simulated using simulation software 720 that applies a particular test suite 730 to the hardware model to determine if it indeed functions as intended. In some embodiments, the simulation software is not recorded, captured or contained in the medium.

Additionally, a circuit level model with logic and/or transistor gates may be produced at some stages of the design process. The model may be similarly simulated some times by dedicated hardware simulators that form the model using programmable logic. This type of simulation taken a degree further may be an emulation technique. In any case, reconfigurable hardware is another embodiment that may involve a machine readable medium storing a model employing the disclosed techniques.

Furthermore, most designs at some stage reach a level of data representing the physical placements of various devices in the hardware model. In the case where conventional semiconductor fabrication techniques are used, the data representing the hardware model may be data specifying the presence or absence of various features on different mask layers or masks used to produce the integrated circuit. Again, this data representing the integrated circuit embodies the techniques disclosed in that the circuitry logic and the data can be simulated or fabricated to perform these techniques.

In any representation of the design, the data may be stored in any form of a machine readable medium. Transmission media such as an optical or electrical wave 760 modulated or otherwise generated to transport such information, and storage media such as a memory 750 or a magnetic or optical storage 640, such as a disk, may be the machine readable medium. Any of these media may carry the design information. The term "carry" (e.g., a machine readable medium carrying information) thus covers information stored on a storage device or information encoded or modulated into or onto a carrier wave. The set of bits describing the design or a particular of the design are (when embodied in a machine readable medium, such as a carrier or storage medium) an article that may be sealed in and out of itself, or used by others for further design or fabrication.

Accordingly, embodiments of the invention enable the reduction of three uOP flows to be performed using two uOP flows while maintaining the atomicity of certain macro-instructions, such as shuffle instructions. In addition, one embodiment reduces a uOP count for algorithms that use a substantial number of shuffle operations such as matrix multiplications. Simulations have shown an 8-9 percent reduction in the uOP count according to embodiments described.

Alternate Embodiments

It will be appreciated that, for other embodiments, a different system configuration may be used. For example, while the system 100 includes a single CPU 110, for other embodiments, a multiprocessor system (where one or more processors may be similar in configuration and operation to the CPU 110 described above) may benefit from the two uOP flow using source override of various embodiments. Further different type of system or different type of computer system such as, for example, a server, a workstation, a desktop computer system, a gaming system, an embedded computer system, a blade server, etc., may be used for other embodiments.

Having disclosed exemplary embodiments and the best mode, modifications and variations may be made to the disclosed embodiments while remaining within the scope of the embodiments of the invention as defined by the following claims.

What is claimed is:

1. A method comprising:
    identifying a macro-instruction having one or more streaming single instruction multiple data extension data type operands;

decoding the identified macro-instruction into a first micro-operation and a second micro-operation, the first micro-operation generated for a least significant bit portion of a source register operand of the identified macro-instruction and the second micro-operation generated for a most significant bit portion of the source register operand of the identified macro-instruction to decode the identified macro-instruction into the first and second micro-operations;

transmitting the first and second micro-operations to a register allocation/reservation logic in a same clock cycle; and asserting a signal to disable source operand override if the first micro-operation updates a logical destination register that matches a logical source register of the second micro-operation.

2. The method of claim 1, wherein decoding comprises:
forwarding the first and second micro-operations to an instruction decoder queue.

3. The method of claim 2, wherein forwarding the first and second micro-options comprises:
receiving the first micro-operation in a current clock cycle;
delaying of the first micro-operation until the second micro-operation is received; and
forwarding the first and second micro-operations during a same clock cycle.

4. The method of claim 1, wherein asserting further comprises:
determining whether a source logical operand of the second micro-operation matches a logical destination operand modified by the first micro-operation;
asserting the signal to the register allocation reservation logic if the logical source operand of the second micro-operation matches the logical destination operand updated by the first micro-operation; and
de-asserting the signal to the register reservation logic if the logical source operand of the second micro-operation and does not match the logical destination operand updated by the first micro-operation.

5. A machine readable storage medium having encoded thereon instructions which may be used to program a system to perform a method, comprising:
identifying a macro-instruction having one or more streaming single instruction multiple data extension data type operands;
decoding the identified macro-instruction into a first micro-operation and a second micro-operation, the first micro-operation generated for a least significant bit portion of a source register operand of the identified macro-instruction and the second micro-operation generated for a most significant bit portion of the source register operand of the identified macro-instruction to decode the identified macro-instruction into the first and second micro-operations;
transmitting the first and second micro-operations to register allocation/reservation logic in a same clock cycle; and
asserting a signal to disable source operand override if the first micro-operation updates a destination register operand that matches a source register operand of the second micro-operation.

6. The machine readable storage medium of claim 5, wherein decoding comprises:
forwarding the first and second micro-operations to an instruction decoder queue.

7. The machine readable storage medium of claim 6, wherein forwarding the first and second micro-operations comprises:
receiving the first micro-operation in a current clock cycle;
delaying of the first micro-operation until the second micro-operation is received; and
forwarding the first and second micro-operations during a same clock cycle.

8. The machine readable storage medium of claim 5, wherein asserting comprises:
determining whether a logical source operand of the second micro-operation matches a logical destination operand modified by the first micro-operation;
asserting the signal to a register reservation logic if the logical source operand of the second micro-operation matches the logical destination operand updated by the first micro-operation; and
de-asserting the signal to the reservation register logic if the logical source operand of the second micro-operation and does not match the logical destination operand.

9. A method comprising:
receiving, during a same clock cycle, a first micro-operation and a second micro-operation decoded from a macro-instruction having one or more streaming single instruction multiple data extension data type operands, the first micro-operation generated for a least significant bit portion of a source register operand of the identified macro-instruction and the second micro-operation generated for a most significant bit portion of the source register operand of the identified macro-instruction to decode the identified macro-instruction into the first and second micro-operations;
allocating a physical source register to the second micro-operation according to the source register operand of the decoded macro-instruction; and
maintaining the physical source register allocated to the second micro-operation if a received signal is asserted to disable source operand override when a logical source register of the second micro-operation matches a logical destination register that is updated by the first micro-operation.

10. The method of claim 9, wherein identifying the first and second micro-operations comprises:
receiving at least two micro-operations during an allocation window;
identifying a slot containing the first micro-operation; and
identifying the second micro-operation according to the identified slot containing the first micro-operation.

11. The method of claim 9, further comprising:
determining whether a source register operand and a destination register operand of the received macro-instruction match;
adjusting the physical source register allocated to the second micro-operation if the signal is de-asserted if the source register operand and destination register operand match.

12. The method of claim 11, wherein adjusting the source register comprises:
determining whether the logical source register of the second micro-operation matches the logical destination register of the first micro-operation;
overriding the physical source register assigned to the second micro-operation if the logical source register of the second micro-operation matches the logical destination register of the first micro-operation; and replacing the physical source register assigned to the second micro-operation to receive a result generated by the first micro-operation.

13. The method of claim 11, wherein maintaining the source register comprises:
   determining whether the first micro-operation is a last micro-operation received during a current allocation window;
   storing a value of the logical destination register of the first micro-operation prior to updating of the logical destination register by the first micro-operation;
   updating an allocation array according to a physical destination register allocated to the first micro-operation from the allocation array;
   assigning the stored value as a physical source register value of the second micro-operation in a next allocation window; and
   monitoring the stored value to update a pointer to the stored value to one of a reorder buffer and a retirement register file if retirement is detected.

14. The method of claim 9, wherein maintaining the source register comprises:
   determining whether the first micro-operation is a last micro-operation received during a current allocation window;
   storing a physical destination register allocated to the first micro-operation from an allocation array;
   disabling update of the allocation array during the current allocation window; and
   updating the allocation array with stored physical destination as a physical destination register assigned to the first micro-operation in a next allocation window.

15. A machine readable storage medium having encoded thereon instructions which may be used to program a system to perform a method, comprising:
   receiving, during a same clock cycle, a first micro-operation and a second micro-operation decoded from a macro-instruction having one or more streaming single instruction multiple data extension data type operands, the first micro-operation generated for a least significant bit portion of a source register operand of the identified macro-instruction and the second micro-operation generated for a most significant bit portion of the source register operand of the identified macro-instruction to decode the identified macro-instruction into the first and second micro-operations;
   allocating a physical source register to the second micro-operation according to a source register operand of the decoded macro-instruction; and
   maintaining the physical source register allocated to the second micro-operation if a received signal is asserted to disable source operand override when a logical source register of the second micro-operation matches a logical destination register that is updated by the first micro-operation.

16. The machine readable storage medium of claim 15, wherein identifying the first and second micro-operations comprises:
   receiving at least two micro-operations during an allocation window;
   identifying a slot containing the first micro-operation decoded from the macro-instruction; and
   identifying the second micro-operation according to the identified slot containing the first micro-operation.

17. The machine readable storage medium of claim 15, wherein the method further comprises:
   determining whether a source register and a destination register of the received macro-instruction match;
   adjusting the physical source register allocated to the second micro-operation if the signal is de-asserted if the source register operand and destination register operand match.

18. The machine readable storage medium of claim 17, wherein adjusting the source register comprises:
   determining whether a logical source register of the second micro-operation matches the logical destination register value of the first micro-operation;
   overriding a physical source register assigned to the second micro-operation if the logical source register of the second micro-operation matches the logical destination register assigned to the first micro-operation; and
   replacing the physical source register assigned to the second micro-operation to receive a result generated by the first micro-operation.

19. The machine readable storage medium of claim 15, wherein maintaining the source register comprises:
   determining whether the first micro-operation is a last micro-operation received during a current allocation window;
   storing a value of the logical destination register of the first micro-operation prior to updating of the logical destination register by the first micro-operation;
   updating an allocation array according to a physical destination register allocated to the first micro-operation from the allocation array;
   assigning the stored value as a physical source register value of the second micro-operation in a next allocation window; and
   monitoring the stored value to update a pointer to the stored value to one of a re-order buffer and a retirement register file if retirement is detected.

20. The machine readable storage medium of claim 15, wherein maintaining the source register comprises:
   determining whether the first micro-operation is a last micro-operation received during a current allocation window;
   storing a physical destination register allocated to the first micro-operation from an allocation array;
   disabling update of the allocation array during the current allocation window; and
   updating the allocation array with stored physical destination as a physical destination register assigned to the first micro-operation in a next allocation window.

21. A processor comprising:
   register allocation/reservation logic to receive, during a same clock cycle, a first micro-operation and a second micro-operation decoded from a received macro-instruction having one or more streaming single instruction multiple data type operands, the first micro-operation generated for a least significant bit portion of a source register operand of the identified macro-instruction and the second micro-operation generated for a most significant bit portion of the source register operand of the identified macro-instruction to decode the identified macro-instruction into the first and second micro-operations, the register allocation/reservation logic to allocate a physical source register to the second micro-operation according to a source register operand of the macro-instruction prior to decoding of the macro-instruction and to maintain the allocated physical source register if a received signal is asserted to disable source operand override when a logical source register of the second micro-operation matches a logical destination register that is updated by the first micro-operation.

22. The processor of claim 21, wherein the register logic comprises:
a register alias table including an entry for each received micro-instruction including a logical source and destination operand of the micro-operations and a physical source and destination operand assigned to the micro-operations.

23. The processor of claim 21, wherein the register logic comprises:
source/destination comparison logic to identify whether the logical destination of a first micro-operation matches the logical source of a second micro-operation, the logic-enabled/disabled according to the received signal; and
source override logic to replace a source register assigned to the second micro-operation with a result generated by first micro-operation when the source/destination logic detects a match.

24. The processor of claim 21, further comprising:
an instruction decoder to decode a received macro-instruction into a first micro-operation and a second micro-operation and assert a signal to disable source register override logic of the register logic if the first micro-operation updates a destination register macro-instruction that matches a source register of the macro-instruction second micro-operation.

25. The process of claim 24, further comprising:
an instruction decoder queue to receive the first and second micro-operations from the instruction decoder and delay forwarding of the first and second micro-operations to the register logic until the first and second micro-operation may be forwarded in a same clock cycle.

26. A system comprising:
a self-contained power source;
a memory controller coupled to a memory;
an I/O controller coupled to he memory controller and one or more I/O devices; and
a processor coupled to the memory controller, including:
an instruction decoder to decode a received macro-instruction into a first micro-operation and a second micro-operation, the instruction decoder to generate the first micro-operation for a least significant bit portion of a source register operand of the identified macro-instruction and to generate the second micro-operation for a most significant bit portion of the source register operand of the identified macro-instruction to decode the identified macro-instruction into the first and second micro-operations, the instruction decoder to assert a signal to disable source register override logic of a register allocation/reservation logic if the first micro-operation updates a logical destination register that matches a logical source register of the macro-instruction second micro-operation; and
the register allocation/reservation logic to receive, during a same clock cycle, the first micro-operation and the second micro-operation decoded from the received macro-instruction having one or more streaming single instruction multiple data type operands, the register allocation/reservation logic to allocate a physical source register to the second micro-operation according to the source register operand of the macro-instruction prior to decoding of the macro-instruction and to maintain the physical source register allocated to the second micro-operation if the signal is asserted by the instruction decoder to disable source operand override when the logical source register of the second micro-operation matches the logical destination register of the first micro-operation.

27. The system of claim 26, wherein the register logic comprises:
a register alias table including an entry for each received micro-instruction including a logical source and destination operand of the micro-operations and a physical source and destination operand assigned to the micro-operations.

28. The system of claim 26, wherein the register logic comprises:
source/destination comparison logic to identify whether the logical destination of the first micro-operation matches the logical source of a second micro-operation, the logic-enabled/disabled according to the received signal; and
source override logic to replace the physical source register assigned to the second micro-operation with a result generated by first micro-operation when the source/destination logic detects a match.

29. The system of claim 26, wherein the processor further comprises:
an instruction decoder queue to receive the first and second micro-operations from the instruction decoder and delay forwarding of the first and second micro-operations to the register logic until the first and second micro-operation may be forwarded in a same clock cycle.

30. The system of claim 26, further comprising:
a graphics controller coupled to the memory controller.

* * * * *

UNITED STATES PATENT AND TRADEMARK OFFICE
CERTIFICATE OF CORRECTION

PATENT NO. : 7,451,294 B2  
APPLICATION NO. : 10/631629  
DATED : November 11, 2008  
INVENTOR(S) : Sperber et al.

Page 1 of 1

It is certified that error appears in the above-identified patent and that said Letters Patent is hereby corrected as shown below:

In column 15, at line 38 delete, "he" and insert --the--.

Signed and Sealed this

Twenty-second Day of December, 2009

David J. Kappos
*Director of the United States Patent and Trademark Office*